US008606274B2

(12) United States Patent
Borst et al.

(10) Patent No.: US 8,606,274 B2
(45) Date of Patent: Dec. 10, 2013

(54) METHOD OF LOAD-AWARE DYNAMIC HANDOVER IN CELLULAR NETWORKS

(75) Inventors: Simon C. Borst, Morristown, NJ (US); Hajo Bakker, Eberdingen (DE); Iraj Saniee, New Providence, NJ (US); Markus Gruber, Korntal-Münchingen (DE)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/078,350

(22) Filed: Apr. 1, 2011

(65) Prior Publication Data
US 2012/0252464 A1    Oct. 4, 2012

(51) Int. Cl.
     *H04W 36/00*      (2009.01)
(52) U.S. Cl.
     USPC ......... 455/436; 455/452.2; 455/453; 370/331
(58) Field of Classification Search
     USPC ........... 455/436–444, 450–451, 452.1–452.2, 455/453; 370/331
     See application file for complete search history.

(56) References Cited

U.S. PATENT DOCUMENTS

| | | | |
|---|---|---|---|
| 7,729,704 B2 | 6/2010 | Borst et al. | |
| 2009/0323638 A1 | 12/2009 | Catovic et al. | |
| 2010/0273487 A1* | 10/2010 | Alonso-Rubio et al. | 455/436 |
| 2011/0007708 A1* | 1/2011 | Hapsari et al. | 370/331 |
| 2011/0098042 A1* | 4/2011 | Mach et al. | 455/435.1 |

FOREIGN PATENT DOCUMENTS

| | | |
|---|---|---|
| EP | 0 505 341 A1 | 9/1992 |
| EP | 0505341 A2 | 9/1992 |
| WO | 2009/002241 A1 | 12/2008 |
| WO | WO-2009002241 A1 | 12/2008 |

OTHER PUBLICATIONS

PCT/US2012/026683, WO, Jun. 14, 2012, International Search Report, 4 Pages.
Huawei: "Principles for intra frequency load balancing", 3GPP Draft; R3-081163 Principles for Intra Frequency Load Balancing, 3rd Generation Partnership Project (3GPP), Mobile Competence Centre; 650, Route Des Lucioles; F-06921 Sophia-Antipolis Cedex; France, vol. RAN WG3, No. Kansas City, USA; 20080430, Apr. 30, 2008, XP050164357, retrieved on Apr. 30, 2008, Paragraph 2.2.
A. Lobinger, "Load balancing in interaction with handover optimisation," FP7 Socrates final workshop, Karlsruhe, Germany, Feb. 22, 2011.
Socrates, "The Socrates Project Homepage," http://www.fp7-socrates.org, Jan. 2008.

(Continued)

*Primary Examiner* — Wayne Cai
(74) *Attorney, Agent, or Firm* — Harness, Dickey & Pierce

(57) ABSTRACT

A handover method is provided, in which a measure of signal strength is obtained between a user terminal and each of one or more candidate cells, relative to signal strength between the user terminal and a source cell. For candidate cells, a threshold is set that depends on a measure of loading of the source cell and a measure of loading of the candidate cell. For the target cell, a particular candidate cell is identified for which the measure of signal strength exceeds the threshold set for that particular cell. The user terminal is connected to the target cell. In specific embodiments, the threshold for each candidate cell depends on a load differential between the source cell and the candidate cell.

19 Claims, 4 Drawing Sheets

(56) References Cited

OTHER PUBLICATIONS

"Self-Optimisation and Self-Configuration in Wireless Networks," available through The Socrates Project Home Page as "SOCRATES Fact Sheet."

Huawei: "Principles for intra frequency load balancing", 3GPP Draft; R3-081163, Meeting #60, Mobile Competence Centre; 650, Route des Lucioles; F-06921 Sophia-Antipolis Cedex; France, Apr. 30, 2008.

International Search Report and Written Opinion dated Oct. 10, 2013 for related International Application No. PCT/US2012/026683.

* cited by examiner

METHOD OF LOAD-AWARE DYNAMIC HANDOVER IN CELLULAR NETWORKS

FIELD OF THE INVENTION

The invention relates to handover in cellular networks.

ART BACKGROUND

Typical wireless communication networks are organized into cells, each of which is served by one or more wireless base stations. (Often, a single base station will serve up to three distinct sectors. For purposes of this discussion, a sector should be regarded as a type of cell.) Ideally, a user situated within a given cell receives the strongest radio signal, relative to interference and noise, from that base station which is identified as serving the given cell. Because many cellular users are mobile, it often happens that during a call, a user terminal moves from a location where the currently serving base station provides the best radio service to a location that is best served by a different base station. To maintain an adequate radio link, it is desirable in such a case for the user terminal to disconnect from the current, or "source" cell, and reconnect to a new "target" cell. The processes that support such a disconnection and reconnection are referred to as "handover". (The term "handoff" is sometimes used in place of "handover". We will treat these two terms as equivalent, and as denoting any and all techniques to which either term is applied.)

Various types of handover are possible. For example, in a "soft" handover the users may be connected to several cells simultaneously and the connection to the new primary cell is made before disconnecting the old primary cell. Soft handovers are used in the UMTS and CDMA standards, whereas "hard" handovers in which the source cell is disconnected before connecting to the target cell are used in GSM and LTE.

Handover decisions may be made by the mobile terminal or by the Radio Network Controller (RNC) or other entity in the Radio Access Network. In LTE in particular, the user terminals make signal measurements, which may trigger handover "events." An event, in turn, may cause the source cell (i.e., the source base station) to send a handover request to the target cell.

The handover decision is generally based on a comparison between the strength of the signal from the source cell, as received by the mobile user terminal, and the strength of signals from other cells, which are candidates to be a target cell. If the difference in signal strength between the source cell and one of the candidate cells satisfies certain threshold conditions, which may apply to both strength and duration, the candidate cell may be designated as a target cell and a request may be sent to it to accept the transferred connection.

A growing problem for wireless network operators is network congestion. For example, for some number of mobile users, the cell offering the strongest radio reception may also be the most heavily loaded with users who are currently being served. Handing over of still more users into that cell will exacerbate the undesirable congestion that may already exist. This may result in degraded quality of service, dropping of calls, denial of service, and the like. All of these may result in loss of revenue for the service provider.

Some researchers have addressed the problem of network congestion with proposals to change architectural parameters of the cellular network in a manner that is meant to better balance the loads. For example, the power levels of pilot signals might be modified in a manner that expands the coverage areas of some cells while contracting others, in order to achieve a balanced load. Although such an approach is of interest, there is also a danger that changing the basic architectural parameters might degrade the capacity and stability of a network. As a consequence, network operators have generally been reluctant to adopt such measures.

What has not been fully exploited is the potential for the handover mechanism itself to help mitigate congestion in cells.

SUMMARY OF THE INVENTION

We have provided a handover mechanism that can help mitigate congestion in cells. More specifically, we have taken note that the threshold on signal strength that is used in making the handover decision is based on at least one parameter that can be dynamically modified to optimize handover performance. For example, handover according to 3GPP standards uses a threshold HOM, plus an additional parameter CIO. We have developed the idea of modifying the signal-strength threshold, exemplarily by modifying CIO, to take into account the loads on the source and candidate cells.

Accordingly, an implementation of our method for handing over a user terminal from a source cell to a target cell is performed, in part, by obtaining a measure of signal strength between the user terminal and each of one or more candidate cells. In this regard, each measure of signal strength is evaluated relative to signal strength between the user terminal and the source cell. The implementation includes, for each of the candidate cells, setting a threshold that depends on a measure of loading of the source cell and a measure of loading of the candidate cell. The implementation further includes identifying a particular candidate cell for which the relative measure of signal strength is greater than the threshold that was set for that particular cell, designating the identified cell as the target cell, and connecting the user terminal to the designated target cell. In specific embodiments, the threshold for each candidate cell depends on a load differential between the source cell and the candidate cell.

DETAILED DESCRIPTION

We will now describe an embodiment in the specific context of LTE networks. It should be noted, however, that our invention is not limited to LTE networks, but may be applied in the context of other standards, not least of which are UMTS and WiMax. Although most readily applied in the context of standards that employ hard handover, those skilled in the art will appreciate that with appropriate adaptations, the ideas presented here may also be applicable in networks, such as CDMA networks, that employ soft handover. More generally, our ideas may be applied in any network in which handover decisions are made with reference to a handover threshold, and in which some measurement of the loading of cells is provided.

Figure 1:
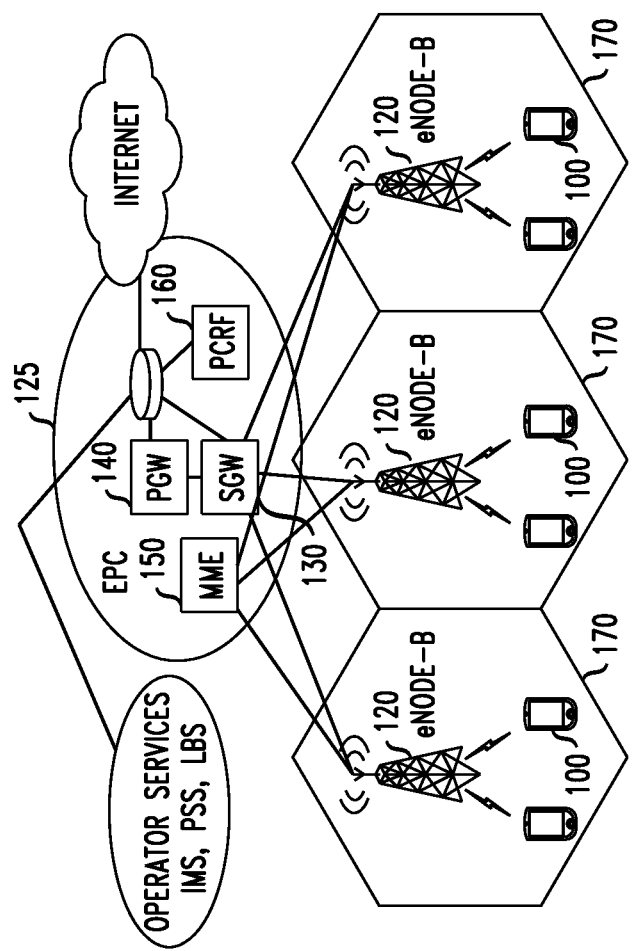
FIG. 1 is a schematic drawing of an LTE network.

LTE is now briefly described with reference to FIG. 1. LTE is a Fourth Generation enhancement to UMTS telecommunication that includes an all-IP networking architecture. LTE is being introduced through a series of releases by the 3rd Generation Partnership Project (3GPP). In LTE, the GPRS core network is replaced by the System Architecture Evolution (SAE), which is a flat, IP-based network architecture. Because LTE is all-IP from end to end, the mobile handsets and other terminal devices 100 for LTE have embedded IP capabilities, and the base stations 120, referred to as Evolved NodeBs (eNodeBs) are IP-based.

The Evolved Packet Core (EPC) 125 is the main architectural component of SAE. It will be seen from the figure that the EPC comprises four elements: the Serving Gateway (SGW) 130, the Packet Data Network Gateway (PGW) 140, the Mobility Management Entity (MME) 150, and the Policy and Charging Rules Function (PCRF) 160. The SCW, PGW, and MME were introduced in 3GPP Release 8, and the PCRF was introduced in 3GPP Release 7.

The SGW is a data plane element. Its primary function is to manage user-plane mobility and to act as a demarcation point between the radio access network (RAN) and the core networks. The SGW maintains data paths between eNodeBs and the PGW.

The PGW is the termination point of the packet data interface toward the packet data networks. As such, it is the entry and exit point for traffic for the UEs, i.e., for the user terminals. The PGW supports operator-defined policy for resource allocation and usage, packet filtering, and charging.

The MME performs the signaling and control functions to manage the UE access to network connections, the assignment of network resources, and the management of the mobility states to support tracking, paging, roaming, and handovers, as well as all other control-plane functions related to subscriber and session management.

The PCRF supports service data flow detection, policy enforcement, and flow-based charging. (In LTE, a service data flow—SDF—is the virtual connection that carries data-plane traffic.)

As shown in the figure, each NodeB 120 is serving a respective cell 170. Such a configuration is purely illustrative, since in actual deployments, the relationship between NodeBs and cells is not necessarily one-to-one. Also, a cell may be subdivided into a small number of sectors, typically three sectors, all of which are typically served by the same NodeB. Handover, however, may take place between sectors that are served by the same NodeB (i.e., as "intra-cell" handover) as well as between sectors that are served by different NodeBs. Accordingly, the term "cell" as used herein should be understood to encompass sectors as a special case of "cells".

Handover techniques have been developed so that a mobile user can enjoy continuity of service while passing out of range of one base station and into the range of another. (As noted, we will treat the terms "handoff" and "handover" as equivalent. We will refer to "base stations" in the general context of cellular telephony, and will use the term "NodeB" when referring specifically to an LTE base station.)

Handover is typically performed by comparing the signal strength of the serving cell with the signal strengths of various alternative cells which are candidate cells for a handover. By "signal strength of the serving cell" is meant the strength, at the mobile terminal, of signals received from that base station which serves the cell to which the mobile terminal is currently assigned. Similarly, the signal strength of a candidate cell is the strength, at the mobile terminal, of signals received from that base station which serves the candidate cell.

In a typical handover algorithm, the difference is taken between the signal strength of the serving cell and the signal strengths of the candidate cells, with a positive value indicating that a candidate cell signal is stronger than the serving cell signal. Given a candidate cell, if this difference is large enough and persists for a sufficient time, a request will be made for a handover of the mobile terminal to the given candidate cell.

In a particular example specified under the 3GPP standards, three handover parameters are defined: TTT is the time to transfer, HOM is the handover margin (also sometimes referred to as the hysteresis parameter Hyst), and CIO(A,B) is the cell individual offset for handover from cell A to cell B.

Figure 2:
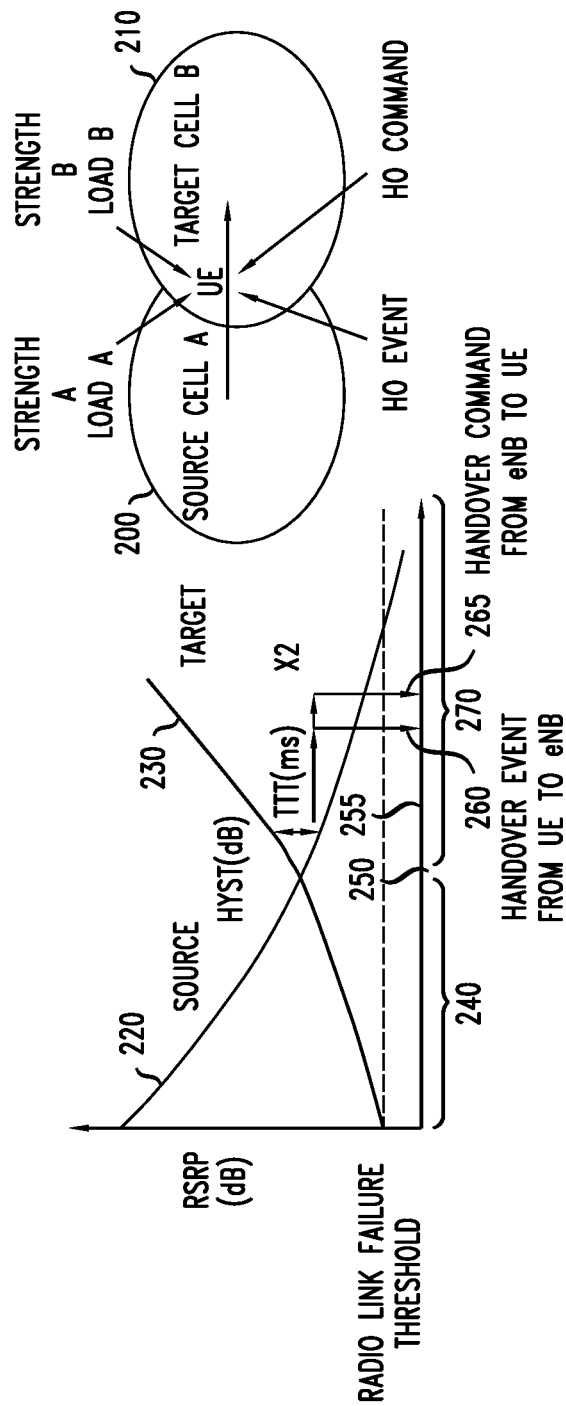
FIG. 2 is a representation of the events leading to a handover. The left-hand portion of the figure is a graph of source and target signal levels as functions of time, with significant events indicated. The right-hand portion of the figure is a schematic representation of the passage of a mobile terminal from the source cell to the target cell.

The significance of the three handover parameters will now be described with reference to FIG. 2. FIG. 2 includes a graph of signal strength versus time for a mobile terminal that is traveling from cell A (reference numeral 200) to cell B (reference numeral 210). Cell A, to which the mobile terminal is currently assigned, is the "source" cell, and cell B, to which a handover request will be made, is the "target" cell, as indicated in the figure.

The measure of signal strength plotted in the figure is the reference signal received power (RSRP) from the source cell (curve 220) and from the target cell (curve 230). (Unless noted otherwise, variables which represent power levels in the current discussion will be expressed in decibel units.) It will be seen that during initial time interval 240 the target RSRP is less than the source RSRP, but at time 250 the target RSRP reaches equality with the source RSRP, and at subsequent times 270 the target RSRP is greater than the source RSRP. At time 255, the excess of the target RSRP over the source RSRP is sufficient for a first condition to be satisfied. In the figure, for illustrative purposes, CIO(A,B) is assumed to be zero, and the first condition is assumed to be $RSRP_B - RSRP_A > HOM$, where the subscripts A and B refer to the cell to which the RSRP pertains. (In the figure, HOM is referred to as Hyst.)

More generally, the first condition may have the form $f(RSRP_B) - f(RSRP_A) > HOM + CIO(A,B)$, where $f(x)$ is a function of the RSRP. In typical examples, $f(x)$ may be a filtered and smoothed value, or some percentile of the signal strength distribution during the interval TTT, which is discussed below.

The parameter CIO(x,y) may be used to shift the handover threshold by as much as a few decibels above or below the base value HOM. Importantly, CIO is not necessarily symmetrical with respect to its arguments x,y; that is, CIO(x,y) may be unequal to CIO(y,x). As a consequence, the threshold for handing over in one direction between a given pair of cells may be set higher than the threshold for handing over in the opposite direction. This can result in a net, average shift of user population from one cell to the other, for example to alleviate overloading and improve throughput in the more loaded of the two cells.

In the course of the handover event triggered at time 255 in, e.g., an LTE network, the mobile terminal senses that a handover threshold has been reached, and a handover event occurs. On occurrence of the handover event, the mobile terminal sends a measurement report to the source cell (i.e., to the source eNodeB). Then, the source cell may send a handover request to the target cell (i.e., to the target eNodeB). If the target cell has sufficient resources, it acknowledges the request.

After the source eNodeB receives the acknowledgement, a second condition must be satisfied: $f(RSRP_B)-f(RSRP_A)$ must remain above the handover threshold (i.e., the first condition must be satisfied) for a duration of TTT. As seen in the figure, the interval TTT expires at time 260. If the first condition has been satisfied over the entire interval from time 255 to time 260, the network, acting, e.g., through the source eNodeB issues a handover command to the mobile station at time 265, which occurs after a delay X2, in order to trigger the handover.

One feature of networks conforming to the current 3GPP standards is that the handover parameters may be adapted dynamically to optimize handover performance. That is, both a lower bound and an upper bound may be specified for the handover success rate. HOM, TTT, and even CIO(x,y) may be reduced in order to advance the handover attempts if the success rate falls below the lower bound, and the same parameters may be raised in order to reduce the number of handover attempts if the success rate rises above the upper bound.

We have modified the handover techniques described above to take into account the loading of the source and candidate cells, according to one or more appropriate measures of loading. By "loading" is meant the level of utilization of any communication resource for which mobile terminals may have to contend, and which may be characterized by one or more measurements of kinds that are supported by the relevant telecommunication standards. For example, an indication of a cell's demand for resource blocks may provide a useful measure of loading. Such an indication may be provided, e.g., by the number of resource blocks used, the (reciprocal of) the portion of the resource blocks allocated to a best-effort user, or the shadow price of a resource block in a utility maximization framework.

Figure 3:
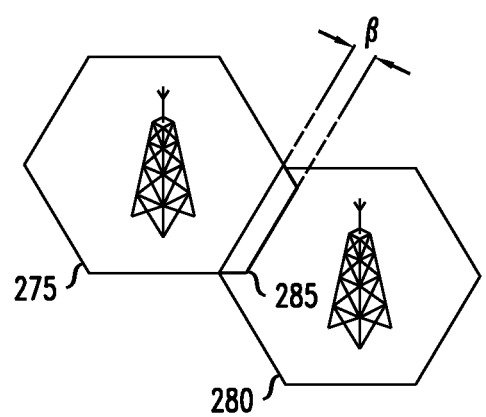
FIG. 3 is a conceptual drawing of a pair of cells that are effectively expanded and contracted, respectively, as a result of modifying a handover parameter value according to methods described herein.

Thus, for example, FIG. 3 shows a lightly loaded cell 275 and a heavily loaded cell 280. Our modified handover technique responds to a loading differential between the cells by effectively expanding lightly loaded cell 275 and shrinking heavily loaded cell 280 accordingly, as illustrated by shifted cell boundary 285.

We believe that load-aware handover of the kind to be described here will be able to automatically and dynamically balance the loads in the cellular network, and by so doing will help to mitigate problems such as persistent localized overload without causing network instability.

However, while improving the load balance between cells, a response that shifts the cell boundaries as illustrated in the figure may also affect the handover success rate. More specifically, heavy loading within a cell can lead to the blocking of new calls and to reduced rates of data delivery (as finite resources are distributed over many users). By employing a load-sensitive handover technique, it is possible to alleviate some of the ill effects of heavy loading within a cell. But on the other hand, the load-sensitive handover technique may also, at times, cause a change (which may be an increase or a decrease) in the handover success rate. Even if there is a decrease in the handover success rate, however, overall network performance may improve if the decrease is compensated by improvements in blocking behavior and/or in rates of data delivery.

In accordance with our new approach, a measure of cell loading is incorporated in the CIO parameter. The characterization of loading may be based on any resource or combination of resources that limits network performance. Because the current 3GPP standards among others, including LTE in particular already support the use of variable values for CIO, our approach can be implemented in a manner that is fully consistent with handover algorithms as currently implemented.

To illustrate this idea as implemented in some embodiments, a proportionality factor β is represented in FIG. 3. The factor β represents a shift in a CIO parameter for handing over between cells 275 and 280, as a fraction of a load differential between the two cells.

As noted above, it may be advantageous at least at times to tolerate a modest decrease in the handover success rate, if there is a compensating gain in throughput achieved through better load balancing. If the network is configured to adaptively optimize the handover parameters as described above, however, a drop in the handover success rate may cause the control loop responsible for adaptive optimization to wholly or partially cancel the load-aware modification of CIO, in order to restore the "optimal" success rate.

Accordingly, another feature of our approach in some implementations is a modification of the handover performance margin that defines a range of handover success rates that is treated as "acceptable" by the adaptive optimization algorithm. In particular, the lower bound on the handover success rate is advantageously reduced by an amount that depends on the cell loading.

Figure 4:
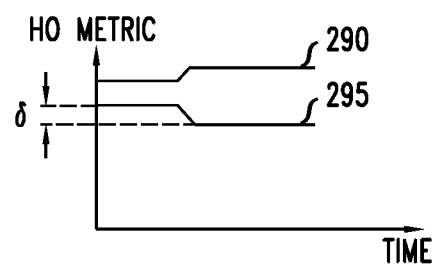
FIG. 4 is a conceptual graph showing how a performance margin for a handover success rate may evolve over time to support the process of FIG. 3.

For example, FIG. 4 shows a performance margin between upper bound 290 and lower bound 295. As seen in the figure, operation of our load-aware technique causes the performance margin to expand. As a further illustration of our approach according to some implementations, a proportionality factor γ is indicated in the figure. The factor γ represents a shift in the performance margin as a fraction of the load differential times the handover frequency.

The factors α and γ are discussed in detail below.

Figure 5:
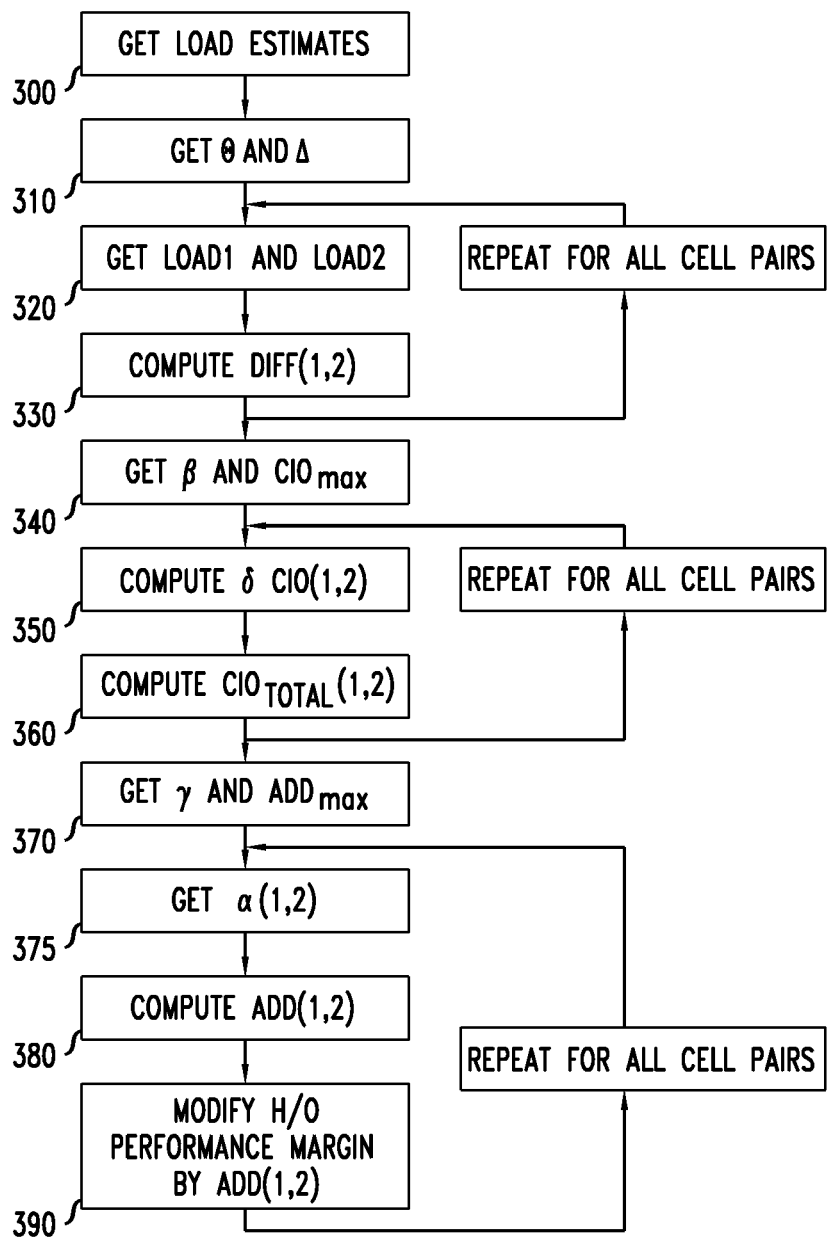
FIG. 5 is a flow chart of an illustrative process for facilitating load-aware handover decisions.

An illustrative example of a load-aware process for modifying the handover parameters will now be described in further detail with reference to FIG. 5.

At block 300 of the figure, a smoothed load estimate is obtained for each cell. The smoothed load estimate is maintained for each cell and/or each sector in the network. The load estimate is averaged over a period of time, e.g. over several minutes. The load metric that is used is, e.g., the same metric used by the network for admission control. The load estimate may be maintained at any of various network entities, such as, for example, a base station or the MME of an LTE network.

At blocks 310-330, the load differentials diff(x,y) are computed for all pairs of cells. In the figure, the computation of the load differential is shown explicitly for one particular pair Cell 1, Cell 2, and only for the handover direction from Cell 1 to Cell 2. As indicated in the figure, the computation is repeated for all cell pairs in the network, and for both handover directions.

One example for the computation of diff(x,y) is provided below. It will be appreciated that the example provided is purely illustrative, and that numerous other definitions may be entertained without deviating from the essential ideas described here. In our example, we have defined the load differential diff(x,y) such that positive values indicate that Cell x is more loaded than Cell y. Thus, diff(x,y) and diff(y,x) cannot both be positive at the same time. Instead (in our example), if one of diff(x,y) and diff(y,x) is positive, the other is zero.

In other implementations, it may be particularly advantageous to define the load differential in a symmetrical manner, i.e., such that diff(x,y) and diff(y,x) are additive inverses of each other. One advantage of such an approach is that it can lead in a more transparent manner to a similarly symmetrical definition for the respective shifts in CIO(x,y) and CIO(y,x). Such a symmetry is useful for defining a shift in the effective cell boundary that is consistent for both x→y handovers and y→x handovers, thus reducing the likelihood of ping-ponging behavior.

In our example, the load differential is further defined such that it takes non-zero values only when the larger load is non-trivial, i.e., at least a threshold $\theta$, and only when the loads of the respective cells differ by a non-trivial amount, i.e., at least by a threshold $\Delta$. The threshold $\theta$ may be set, e.g., to some percentage of the maximum sustainable load. The threshold $\Delta$ is useful as a hysteresis margin for preventing small fluctuations in the relative loading between the cells from causing the CIO value to oscillate. Accordingly, appropriate values for $\Delta$ may be determined from statistical analysis of historical data.

At block 310, the parameters $\theta$ and $\Delta$ are obtained. These values may be pre-set and/or updated periodically. They may be stored at, e.g., the MME of an LTE network, communicated from the MME to the NodeBs, and communicated from the NodeBs to the mobile terminals.

At block 320, the loads load1 and load2 of Cell 1 and Cell 2, respectively, are obtained. This step is performed, e.g., at the MME of an LTE network, communicated from the MME to the affected NodeBs, and communicated from the NodeBs to the mobile terminals in the affected cells.

At block 330, diff(1,2) is computed according to the equation, $$\mathit{diff}(1,2) = \max\{\min[\mathrm{load1}-\theta, \mathrm{load1}-\mathrm{load2}-\Delta], 0\}.$$

In other words:

If (load1−$\theta$)>0, and (load1−load2−$\Delta$)>0, and (load1−$\theta$)>(load1−load2−$\Delta$), then $\mathit{diff}(1,2)$=load1−load2−$\Delta$.

If (load1−$\theta$)>0, and (load1−load2−$\Delta$)>0, and (load1−$\theta$)<(load1−load2−$\Delta$), then $\mathit{diff}(1,2)$=load1−$\theta$.

If (load1−$\theta$)<0, or if (load1−load2−$\Delta$)<0, then $\mathit{diff}(1,2)$=0.

The computation of diff(1,2) may be performed at any of various network nodes. Advantageously, it is performed at the affected NodeBs or at the MME, and the CIO values are passed down to the affected mobile terminals.

As those skilled in the art will readily appreciate, all computations referred to herein may be performed by digital processing machines, which may, by way of example and not limitation, be digital signal processors or special or general purpose computers operating under appropriate hardware, software, or firmware control. In particular, such machines may operate as directed by machine-executable instructions provided as recorded in a tangible, non-transitory, machine-readable medium.

It will be seen that as defined in this example, diff(1,2) is continuous in the values of its arguments load1 and load2. This is advantageous for ensuring that the dynamic response of the network will be smooth, i.e., that there will be no sudden, large jumps in parameter values.

It should be noted in this regard that load is typically based on discrete changes at the granularity level of resource blocks, for example twenty-five resource blocks in typical scenarios. However, in at least some cases it may be advantageous to employ time-averaged load metrics to smooth out spikes.

At blocks 340-350, load-aware CIO shifts $\delta\mathrm{CIO}(x,y)$ are computed. Each shift will be combined with the conventional (i.e., not load-aware) cell individual offset CIO(x,y) to form a total cell individual offset $\mathrm{CIO}_{TOTAL}(x,y)=\mathrm{CIO}(x,y)-\delta\mathrm{CIO}(x,y)$. The shifts may be computed at the affected mobile terminals, or, for example, they may be computed at a higher level such as the affected NodeBs or the MME and communicated, with the values CIO(x,y), down to the mobile terminals. In the figure, the CIO computation is shown explicitly for one particular pair Cell 1, Cell 2. As indicated in the figure, the computation is repeated for all cell pairs in the network.

As defined in this example, CIO(x,y)+CIO(y,x)=0, so if the CIO is known for one handover direction between a pair of cells, it is also known for the other direction. CIO(x,y) is also defined so that whenever diff(1,2) is zero, the value of $\mathrm{CIO}_{TOTAL}$ reverts to the conventional value CIO(x,y).

Turning back to FIG. 5, the parameters $\beta$ and $\mathrm{CIO}_{max}$ are obtained at block 340. These values may be pre-set and/or updated periodically. They may be stored at, e.g., the MME of an LTE network, and/or they may be communicated from the MME to the NodeBs, and communicated from the NodeBs to the mobile terminals.

The parameter $\beta$ determines how sensitive CIO(x,y) will be to changes in the load differential, and thus may be used to determine the tradeoff between load balancing and conventional handover optimization. In particular, the handover process will revert to the conventional process if $\beta$ is set to zero.

The parameter $\mathrm{CIO}_{max}$ defines upper and lower bounds (which are symmetric about zero) for the CIO shift $\delta\mathrm{CIO}(x,y)$. As defined here, $\mathrm{CIO}_{max}$ is greater than or equal to zero.

Ideally, the load differentials will influence the handover decisions only when load imbalances between cells are severe, or when they are substantial and persistent. When load imbalances are moderate or only momentary, it will generally be more advantageous to permit the handover parameters to adapt without considering the load differentials. The parameters $\beta$ and $\mathrm{CIO}_{max}$ are useful for limiting the loading conditions under which the load differentials have a substantial effect on the handover decisions. Initial values of $\beta$ and $\mathrm{CIO}_{max}$ may be determined, for example, from modeling studies aimed at optimizing performance over a variety of possible loading conditions.

Turning again to FIG. 3, the CIO shift $\delta\mathrm{CIO}(1,2)$ is computed at block 350 according to the equation $$\delta CIO(1,2) = \min\{\beta \cdot \mathit{diff}(1,2), CIO_{max}\} + \max\{-\beta \cdot \mathit{diff}(2,1), -CIO_{max}\}.$$

That is, if $\mathit{diff}(1,2)>0$ and $\beta \cdot \mathit{diff}(1,2) > CIO_{max}$, then $\delta CIO(1,2) = CIO_{max}$;

if $\mathit{diff}(1,2)>0$ and $\beta \cdot \mathit{diff}(1,2) < CIO_{max}$, then $\delta CIO(1,2) = \beta \cdot \mathit{diff}(1,2)$;

if $\mathit{diff}(2,1)>0$ and $\beta \cdot \mathit{diff}(2,1) > CIO_{max}$, then $\delta CIO(1,2) = -CIO_{max}$;

if $\mathit{diff}(2,1)>0$ and $\beta \cdot \mathit{diff}(2,1) < CIO_{max}$, then $\delta CIO(1,2) = -\beta \cdot \mathit{diff}(2,1)$;

if $\mathit{diff}(2,1) = \mathit{diff}(1,2) = 0$, then $\delta CIO(1,2) = \delta CIO(1,2) = 0$.

At block 360, the total CIO parameter is computed as $$CIO_{TOTAL}(1,2) = CIO(1,2) - \delta CIO(1,2).$$

The total CIO parameter may be computed at any of various network entities. Advantageously, it is computed at the affected NodeBs or the MME and communicated down to the mobile terminals. In the figure, the CIO computation is shown explicitly for one particular pair Cell 1, Cell 2. As indicated in the figure, the computation is repeated for all cell pairs in the network.

Turning again to FIG. 5, blocks 370-390 represent an exemplary series of steps for modifying the handover performance margin so as to suppress adaptation of the handover parameters that would otherwise oppose the effect of the load-aware features, as explained above. These steps would typically be carried out at a network entity, such as the MME of an LTE network, responsible for adaptive optimization of HOM, TTT, and CIO.

At block 370, the parameters $\gamma$ and $ADD_{max}$ are obtained. At block 375, the parameter $\alpha(x,y)$ is obtained. The parameter $\alpha(x,y)$ is a measure of the relative handover frequency from Cell x to Cell y. It can be computed from data obtained by a network entity such as the base station or, e.g., the MME of an LTE network. In one possible scenario, for example, data about handover frequencies may be collected by individual NodeBs and forwarded to the MME for compilation.

In the figure, $\alpha(x,y)$ is shown explicitly as being obtained for one particular pair Cell 1, Cell 2. As indicated in the figure, this step may be repeated for all cell pairs in the network.

Our modification of the handover performance margin adds a dependence on load differentials to the admissible range for the handover success rate. More specifically: Given a given pair of cells (x,y) with load differential diff(x,y), the distance between the lower and upper limits of the admissible range is shifted by an amount that is proportional (within a specified range) to the relative handover frequency $\alpha(x,y)$ (or, e.g., to an average of such frequencies) and to the load differential. The parameter $\gamma$ is the proportionality factor that determines how sensitive the performance margin will be to changes in the product $\alpha(x,y) \cdot diff(x,y)$.

The parameter $ADD_{max}$ imposes an upper limit on the amount by which the handover performance margin can be modified.

Initial values of $\gamma$ and $ADD_{max}$ may be determined, for example, from modeling studies aimed at optimizing performance over a variety of possible loading conditions.

Turning back to FIG. 5, in one implementation a pairwise shift ADD(x,y) is computed at block 380 according to the following equation, in which it is assumed that diff(1,2)>0:

$$ADD(1,2)=\alpha(1,2) \cdot \min\{\gamma \cdot diff(1,2), ADD_{max}\},$$

and so forth for other values of (x,y).

As indicated at block 390, the handover performance margin for cell 1 is then modified by reducing the lower limit and raising the upper limit such that the respective limits are moved apart by ADD(1,2). At the same time, the handover performance margin for cell 2 is modified by reducing the lower limit and raising the upper limit by a total of ADD(2,1), which is defined (assuming that diff(1,2) is positive) by:

$$ADD(2,1)=\alpha(2,1) \cdot \min\{\gamma \cdot diff(1,2), ADD_{max}\}.$$

In the figure, the computation of ADD(x,y) and the modification of the handover performance margin are shown explicitly for only one particular pair Cell 1, Cell 2. As indicated in the figure, these steps are repeated for all cell pairs in the network.

Often, it will be advantageous to apply a single performance margin adjustment ADD(x) to each cell x, in which ADD(x) is obtained by summing ADD(x,y) over all cells that are neighbors of cell x. It will be understood in this regard that ADD(x) relates to the success rate for handovers from cell x to other, neighboring cells. It should also be noted in this regard that although a separate performance margin may be specified for each cell pair, in practice it is more typical to set a single performance margin for the aggregate success rate over all neighbor pairs.

More generally, a performance margin adjustment ADD(x) may be computed for each cell x by first computing a pairwise shift $ADD_{pair}(x,y)$ according to the equation $$ADD_{pair}(x,y)=\alpha(x,y) \cdot \min\{\gamma \cdot \max\{diff(x,y), diff(y,x)\}, ADD_{max}\},$$

and then by summing $ADD_{pair}(x,y)$ over all neighbor cells y of cell x.

Various alternative ways to shift the handover performance margin will be apparent to those skilled in the art, and are not excluded. For example, without limitation, the lower limit of the performance margin may be reduced by $0.5 \cdot ADD(1,2)$ and the upper limit raised by the same amount. As will be understood, yet other alternatives may be applied in which the lower and upper limits are shifted asymmetrically, in a particular example by reducing the lower limit without raising the upper limit.

The invention claimed is:

1. A method of handing over a user terminal from a source cell to a target cell of a wireless network, comprising:
   for at least one candidate cell, obtaining a measure of signal strength between the user terminal and the at least one candidate cell;
   for the at least one candidate cell, selecting at least one of a first value, a second value and a reference value, the first value being associated with a load of the source cell and the second value being associated with a load differential between the load of the source cell and the load of the at least one candidate cell;
   for the at least one candidate cell, setting a threshold by computing a maximum of the reference value and a minimum of the first value and the second value;
   for the at least one candidate cell, comparing the measure of signal strength to the threshold;
   designating, as the target cell, the at least one candidate cell if the measure of signal strength associated with the at least one candidate cell is greater than the threshold; and
   requesting a handover to the designated target cell.

2. The method of claim 1, wherein for the at least one candidate cell, the threshold is computed, in part, from a cell individual offset (CIO), and the CIO is determined, at least in part, from the load differential between the at least one candidate cell and the source cell.

3. The method of claim 2, wherein the CIO is determined such that for rising load differentials in at least some ranges of load in the source cell and the at least one candidate cell,
   the threshold rises for handover to the at least one candidate cell if the at least one candidate cell is more loaded than the source cell, and
   the threshold falls for handover to the at least one candidate cell if the at least one candidate cell is less loaded than the source cell.

4. The method of claim 1, wherein values corresponding to loads of the source cell and the at least one candidate cell provide an indication of demand for resource blocks by the corresponding cell.

5. The method of claim 1, wherein the method is carried out by a base station serving the source cell.

6. The method of claim 1, further comprising:
   connecting the user terminal to the designated target cell.

7. The method of claim 1, wherein
   a performance margin is specified for a handover success rate to the at least one candidate cell, such that a handover success rate falling outside of said margin is a potential triggering event for reoptimization of handover parameters; and the method further comprises shifting, in response to the potential triggering event, the performance margin by shifting at least one of an upper bound and a lower bound on the handover success rate.

8. The method of claim 7, wherein the performance margin is shifted so as to tolerate a reduced handover success rate.

9. The method of claim 7, wherein the performance margin is shifted by an amount that depends on the load differential between the source cell and the at least one candidate cell.

10. The method of claim 7, wherein the performance margin is shifted by an amount that depends on an average or cumulative load differential between the source cell and each of a group of neighbor cells.

11. The method of claim 1, wherein:
for the at least one candidate cell, the threshold is computed, in part, from a cell individual offset (CIO);
the CIO is determined, at least in part, from the load differential between the the at least one candidate cell and the source cell such that for rising load differentials in at least some ranges of load in the source cell and the at least one candidate cell,
the threshold rises for handover to the at least one candidate cell if the at least one candidate cell is more loaded than the source cell, and
the threshold falls for handover to the at least one candidate cell if the at least one candidate cell is less loaded than the source cell; and
the method further comprises selecting a parameter value that defines how sensitive the rise and fall of the CIO shall be to the load differential.

12. A non-transitory computer readable medium including computer program product, the computer program product comprising instructions, which when executed on a computer, cause the computer to perform functions for handing over a user terminal from a source cell to a target cell of a wireless network, the functions including:
for at least one candidate cell, obtaining a measure of signal strength between the user terminal and the at least one candidate cell;
for the at least one candidate cell, selecting at least one of a first value, a second value and a reference value, the first value being associated with a load of the source cell and the second value being associated with a load differential between the load of the source cell and the load of the at least one candidate cell;
for the at least one candidate cell, setting a threshold by computing a maximum of the reference value and a minimum of the first value and the second value;
for the at least one candidate cell, comparing the measure of signal strength to the threshold;
designating, as the target cell, the at least one candidate cell if the measure of signal strength associated with the at least one candidate cell is greater than the threshold; and
requesting a handover to the designated target cell.

13. A device, comprising:
a processor configured to,
for at least one candidate cell, obtaining a measure of signal strength between a user terminal and the at least one candidate cell;
for the at least one candidate cell, selecting at least one of a first value, a second value and a reference value, the first value being associated with a load of a source cell and the second value being associated with a load differential between the load of the source cell and the load of the at least one candidate cell;
for the at least one candidate cell, setting a threshold by computing a maximum of the reference value and a minimum of the first value and the second value;
for the at least one candidate cell, comparing the measure of signal strength to the threshold;
designating, as a target cell, the at least one candidate cell if the measure of signal strength associated with the at least one candidate cell is greater than the threshold; and
requesting a handover of the user terminal from the source cell to the designated target cell.

14. The device of claim 13, wherein the processor is further configured to compute the threshold, in part, from a cell individual offset (CIO), and the CIO is determined, at least in part, from the load differential between the at least one candidate cell and the source cell.

15. The device of claim 14, wherein the processor is further configured to determine the CIO such that for rising load differentials in at least some ranges of load in the source cell and the at least one candidate cell,
the threshold rises for handover to the at least one candidate cell if the at least one candidate cell is more loaded than the source cell, and
the threshold falls for handover to the at least one candidate cell if the at least one candidate cell is less loaded than the source cell.

16. The device of claim 13, wherein the device is a base station serving the source cell.

17. The device of claim 13, wherein the processor is further configured to,
specify a performance margin for a handover success rate to the at least one candidate cell, such that a handover success rate falling outside of said margin is a potential triggering event for reoptimization of handover parameters; and
shift, in response to the potential triggering event, the performance margin by shifting at least one of an upper bound and a lower bound on the handover success rate.

18. The device of claim 17, wherein the processor shifts the performance margin so as to tolerate a reduced handover success rate.

19. The device of claim 17, wherein the processor shifts the performance margin by an amount that depends on the load differential between the source cell and the at least one candidate cell.

* * * * *